United States Patent
Ryon et al.

(10) Patent No.: US 11,608,783 B2
(45) Date of Patent: Mar. 21, 2023

(54) SURFACE IGNITER COOLING SYSTEM

(71) Applicant: Delavan Inc., Des Moines, IA (US)

(72) Inventors: Jason Ryon, Carlisle, IA (US); Lev Alexander Prociw, Johnston, IA (US)

(73) Assignee: Delavan, Inc., Des Moines, IA (US)

( * ) Notice: Subject to any disclaimer, the term of this patent is extended or adjusted under 35 U.S.C. 154(b) by 232 days.

(21) Appl. No.: 17/089,254

(22) Filed: Nov. 4, 2020

(65) Prior Publication Data

US 2022/0136696 A1     May 5, 2022

(51) Int. Cl.
*F02C 7/264*     (2006.01)

(52) U.S. Cl.
CPC .... *F02C 7/264* (2013.01); *F23R 2900/00009* (2013.01)

(58) Field of Classification Search
CPC . F02C 7/264; F23R 2900/00009; F23Q 7/001
See application file for complete search history.

(56) References Cited

U.S. PATENT DOCUMENTS

| | | | |
|---|---|---|---|
| 2,540,642 A | 2/1951 | Allen et al. |
| 2,541,900 A | 2/1951 | Williams |
| 2,645,082 A | 7/1953 | Sarto |
| 2,648,951 A | 8/1953 | McDougal |
| 2,734,341 A | 2/1956 | Lovesey |
| 2,784,553 A | 3/1957 | De et al. |
| 2,811,676 A | 10/1957 | Smits |
| 2,840,742 A | 6/1958 | Watters |
| 2,847,826 A | 8/1958 | Dennis |
| 2,864,234 A | 12/1958 | Seglem et al. |
| 2,885,859 A | 5/1959 | Barberis |
| 2,958,196 A | 11/1960 | Wie et al. |

(Continued)

FOREIGN PATENT DOCUMENTS

| DE | 1064760 B | 9/1959 |
|---|---|---|
| DE | 102018214281 B3 | 8/2019 |

(Continued)

OTHER PUBLICATIONS

Extended European Search Report for EP Application No. 21192156.4, dated Feb. 1, 2022, 7 pages.

(Continued)

*Primary Examiner* — Arun Goyal
*Assistant Examiner* — Henry Ng
(74) *Attorney, Agent, or Firm* — Kinney & Lange, P.A.

(57) ABSTRACT

An embodiment of a torch igniter for a combustor of a gas turbine engine includes a combustion chamber oriented about an axis, a cap defining an axially upstream end of the combustion chamber, a tip defining the axially downstream end of the combustion chamber, an igniter wall extending from the cap to the tip and defining a radial extent of the combustion chamber, a structural wall coaxial with and surrounding the igniter wall, an outlet passage defined by the igniter wall within the tip, a glow plug housing configured to receive a glow plug and allow an innermost end of the glow plug to extend into the combustion chamber, and a cooling system. The cooling system includes an air inlet formed within an exterior of the structural wall, a cooling channel forming a flow path through the structural wall at the glow plug housing, and an air passage.

18 Claims, 7 Drawing Sheets

(56) References Cited

U.S. PATENT DOCUMENTS

| | | | |
|---|---|---|---|
| 2,967,224 A | 1/1961 | Irwin | |
| 3,009,321 A | 11/1961 | Jones et al. | |
| 3,487,636 A | 1/1970 | Scott et al. | |
| 3,558,251 A | 1/1971 | Bauger et al. | |
| 3,690,093 A | 9/1972 | Carlisle | |
| 3,898,797 A | 8/1975 | Wood | |
| 3,954,389 A | 5/1976 | Szetela | |
| 3,990,834 A | 11/1976 | Dubell et al. | |
| 4,012,904 A | 3/1977 | Nogle | |
| 4,099,373 A | 7/1978 | Griffin et al. | |
| 4,112,675 A | 9/1978 | Pillsbury et al. | |
| 4,141,213 A | 2/1979 | Ross | |
| 4,192,139 A | 3/1980 | Buchheim | |
| 4,194,358 A | 3/1980 | Stenger | |
| 4,351,156 A | 9/1982 | White et al. | |
| 4,412,414 A | 11/1983 | Novick et al. | |
| 4,441,323 A | 4/1984 | Colley | |
| 4,828,488 A * | 5/1989 | Reiser | F23Q 7/001 431/263 |
| 4,860,533 A | 8/1989 | Joshi | |
| 4,912,931 A | 4/1990 | Joshi et al. | |
| 4,915,615 A | 4/1990 | Kawamura et al. | |
| 5,085,040 A | 2/1992 | Tilston | |
| 5,390,855 A | 2/1995 | Mims et al. | |
| 5,469,700 A | 11/1995 | Corbett et al. | |
| 5,499,497 A | 3/1996 | Defreitas | |
| 5,636,511 A | 6/1997 | Pfefferle et al. | |
| 5,640,841 A | 6/1997 | Crosby | |
| 5,673,554 A | 10/1997 | Defreitas et al. | |
| 5,695,328 A | 12/1997 | Defreitas et al. | |
| 5,720,163 A | 2/1998 | Pfefferle et al. | |
| 5,744,206 A | 4/1998 | Russek et al. | |
| 5,845,480 A | 12/1998 | Defreitas et al. | |
| 6,138,654 A | 10/2000 | Pretorius et al. | |
| 6,195,247 B1 | 2/2001 | Cote et al. | |
| 6,240,731 B1 | 6/2001 | Hoke et al. | |
| 6,247,300 B1 | 6/2001 | Muramatsu et al. | |
| 6,483,022 B1 | 11/2002 | Packard | |
| 6,884,967 B1 | 4/2005 | Leigh | |
| 6,915,638 B2 | 7/2005 | Runkle et al. | |
| 6,952,927 B2 | 10/2005 | Howell et al. | |
| 6,968,699 B2 | 11/2005 | Howell et al. | |
| 7,124,724 B2 | 10/2006 | Fleetwood | |
| 7,137,255 B2 | 11/2006 | Schmotolocha et al. | |
| 7,216,488 B2 | 5/2007 | Howell et al. | |
| 7,470,875 B1 | 12/2008 | Wilcox et al. | |
| 7,481,248 B2 | 1/2009 | Prociw et al. | |
| 7,637,094 B2 | 12/2009 | Costello et al. | |
| 8,365,710 B2 | 2/2013 | Lykowski et al. | |
| 8,713,944 B2 | 5/2014 | Bleeker | |
| 9,080,772 B2 | 7/2015 | Prociw et al. | |
| 9,135,755 B2 | 9/2015 | Youssef | |
| 9,279,398 B2 | 3/2016 | McAlister | |
| 9,413,141 B2 | 8/2016 | Leglaye et al. | |
| 9,453,491 B2 | 9/2016 | Tanaka et al. | |
| 9,476,399 B1 | 10/2016 | Munson | |
| 9,567,912 B2 | 2/2017 | Prociw et al. | |
| 10,041,859 B2 | 8/2018 | Desilva et al. | |
| 10,156,189 B2 | 12/2018 | Sze et al. | |
| 10,488,047 B2 | 11/2019 | Ott et al. | |
| 10,584,639 B2 | 3/2020 | Dam et al. | |
| 10,711,699 B2 | 7/2020 | Dam et al. | |
| 10,823,398 B2 | 11/2020 | Choudhri et al. | |
| 11,209,164 B1 | 12/2021 | Ryon et al. | |
| 11,226,103 B1 | 1/2022 | Ryon et al. | |
| 11,255,535 B1 | 2/2022 | Eckert et al. | |
| 2002/0050061 A1 | 5/2002 | Komyoji et al. | |
| 2002/0162333 A1 | 11/2002 | Zelina | |
| 2004/0050061 A1 | 3/2004 | Schmotolocha et al. | |
| 2004/0168442 A1 | 9/2004 | Schmotolocha et al. | |
| 2005/0053876 A1 | 3/2005 | Joos et al. | |
| 2005/0166595 A1 | 8/2005 | Fletcher et al. | |
| 2005/0284442 A1 | 12/2005 | Stuttaford et al. | |
| 2006/0054233 A1 | 3/2006 | Prociw et al. | |
| 2006/0168967 A1 | 8/2006 | Simons et al. | |
| 2008/0036209 A1 | 2/2008 | Bulkovitch | |
| 2008/0141651 A1 | 6/2008 | Eason et al. | |
| 2008/0299504 A1 * | 12/2008 | Horn | F24C 3/14 431/267 |
| 2009/0234555 A1 | 9/2009 | Williams et al. | |
| 2009/0314000 A1 | 12/2009 | Evulet et al. | |
| 2010/0043444 A1 | 2/2010 | Gross et al. | |
| 2010/0126617 A1 | 5/2010 | Stroempl et al. | |
| 2011/0088409 A1 | 4/2011 | Carlisle | |
| 2011/0113787 A1 | 5/2011 | Milosavljevic | |
| 2011/0247590 A1 | 10/2011 | Donovan | |
| 2011/0271684 A1 | 11/2011 | Corsmeier et al. | |
| 2012/0085468 A1 | 4/2012 | Walker | |
| 2012/0125008 A1 | 5/2012 | Prociw et al. | |
| 2013/0000323 A1 | 1/2013 | Kupratis | |
| 2013/0040255 A1 | 2/2013 | Shi et al. | |
| 2013/0143171 A1 | 6/2013 | Soda et al. | |
| 2013/0174562 A1 | 7/2013 | Holcomb et al. | |
| 2013/0283800 A1 | 10/2013 | Romig et al. | |
| 2014/0060063 A1 | 3/2014 | Boardman et al. | |
| 2014/0150401 A1 | 6/2014 | Venter | |
| 2014/0215997 A1 | 8/2014 | Lior et al. | |
| 2014/0216384 A1 | 8/2014 | Tanaka et al. | |
| 2014/0260304 A1 | 9/2014 | Cummings et al. | |
| 2014/0290259 A1 | 10/2014 | Plante et al. | |
| 2014/0314548 A1 | 10/2014 | Rivers et al. | |
| 2014/0366505 A1 | 12/2014 | Prociw et al. | |
| 2014/0366542 A1 | 12/2014 | Teets | |
| 2014/0366551 A1 | 12/2014 | Prociw et al. | |
| 2015/0036781 A1 | 2/2015 | Youssef | |
| 2015/0040575 A1 | 2/2015 | Martinez Fabre et al. | |
| 2015/0260406 A1 | 9/2015 | Carrere | |
| 2015/0275755 A1 | 10/2015 | Ogata et al. | |
| 2015/0275769 A1 | 10/2015 | Foutch et al. | |
| 2015/0308351 A1 | 10/2015 | Sheridan | |
| 2015/0345426 A1 | 12/2015 | Houston et al. | |
| 2015/0345788 A1 | 12/2015 | Miyata et al. | |
| 2015/0354517 A1 | 12/2015 | Mansour et al. | |
| 2016/0003150 A1 | 1/2016 | DiCintio et al. | |
| 2016/0010559 A1 | 1/2016 | Hoke et al. | |
| 2016/0047318 A1 | 2/2016 | Dam et al. | |
| 2016/0084169 A1 | 3/2016 | Stuttaford et al. | |
| 2016/0169110 A1 | 6/2016 | Myers et al. | |
| 2016/0230993 A1 | 8/2016 | Dai et al. | |
| 2017/0082022 A1 | 3/2017 | Lee | |
| 2017/0138266 A1 | 5/2017 | Caples | |
| 2017/0145852 A1 | 5/2017 | McCune et al. | |
| 2017/0284298 A1 | 10/2017 | Suciu et al. | |
| 2017/0298822 A1 | 10/2017 | Garde La Casa | |
| 2017/0350590 A1 | 12/2017 | Choudhri et al. | |
| 2017/0356656 A1 | 12/2017 | Ogata et al. | |
| 2018/0003388 A1 | 1/2018 | Park | |
| 2018/0010795 A1 | 1/2018 | Nath et al. | |
| 2018/0051710 A1 | 2/2018 | Takamura et al. | |
| 2018/0058224 A1 | 3/2018 | Jennings et al. | |
| 2018/0058331 A1 | 3/2018 | Barton et al. | |
| 2018/0058404 A1 | 3/2018 | Tibbs | |
| 2018/0100437 A1 | 4/2018 | Dicintio et al. | |
| 2018/0134407 A1 | 5/2018 | Elbibary et al. | |
| 2018/0154446 A1 | 6/2018 | Brown et al. | |
| 2018/0170575 A1 | 6/2018 | Ziarno | |
| 2018/0172271 A1 | 6/2018 | Moniz et al. | |
| 2018/0179896 A1 | 6/2018 | Pal et al. | |
| 2018/0179956 A1 | 6/2018 | Wertz | |
| 2018/0283692 A1 | 10/2018 | Ryon et al. | |
| 2018/0356095 A1 | 12/2018 | Patel et al. | |
| 2018/0363555 A1 | 12/2018 | Zelina et al. | |
| 2019/0010872 A1 | 1/2019 | Dam et al. | |
| 2019/0024897 A1 | 1/2019 | Prociw et al. | |
| 2019/0032561 A1 | 1/2019 | Stoia et al. | |
| 2019/0178497 A1 | 6/2019 | Jones et al. | |
| 2019/0249877 A1 | 8/2019 | Fryer | |
| 2020/0080530 A1 | 3/2020 | Freer et al. | |
| 2020/0088409 A1 | 3/2020 | Greenfield et al. | |
| 2020/0191059 A1 | 6/2020 | Ryon et al. | |
| 2020/0309378 A1 | 10/2020 | Dam et al. | |
| 2020/0348024 A1 | 11/2020 | Hicks | |

(56) References Cited

U.S. PATENT DOCUMENTS

| | | |
|---|---|---|
| 2021/0215100 A1 | 7/2021 | Head et al. |
| 2022/0007488 A1 | 1/2022 | Bai et al. |

FOREIGN PATENT DOCUMENTS

| | | |
|---|---|---|
| EP | 2189720 A1 | 5/2010 |
| EP | 3128166 A1 | 2/2017 |
| EP | 2677240 B1 | 4/2020 |
| FR | 970988 A | 1/1951 |
| FR | 1218296 A | 5/1960 |
| GB | 693846 A | 7/1953 |
| GB | 791990 A | 3/1958 |
| GB | 819141 A | 8/1959 |
| GB | 859184 A | 1/1961 |
| JP | 2015021715 A | 2/2015 |
| KR | 101279722 B1 | 6/2013 |

OTHER PUBLICATIONS

Extended European Search Report for EP Application No. 21216163.2, dated May 16, 2022, 8 pages.
Extended European Search Report for EP Application No. 21209057.5, dated Jul. 19, 2022, 8 pages.
Extended European Search Report for EP Application No. 21205393.8, dated Mar. 17, 2022, 8 pages.
Extended European Search Report for EP Application No. 21214883.7, dated May 13, 2022, pp. 10.
"Metal Seal Design Guide—High Performance Engineered Seals and Sealing Systems", from Parker Hannlfin Corporation Composite Sealing Systems Division, 2016, 106 pages.
Database WPI—2017 Clarivate Analytics, Week 201919, Thomson Scientific, London GB; AN 2019-17673X XP002806356, 2 pages.
Extended European Search Report for EP Application No. 21215655.8, dated May 2, 2022, 8 pages.
Extended European Search Report for EP Application No. 21215709.3, dated May 12, 2022, 9 pages.
Extended European Search Report for EP Application No. 21212869.8, dated Apr. 28, 2022, pp. 7.
Extended European Search Report for EP Application No. 21213899.4, dated May 6, 2022, 8 pages.
Extended European Search Report for EP Application No. 21214511 4, dated Apr. 29, 2022, 8 pages.
Extended European Search Report for EP Application No. 21214798.7, dated May 11, 2022, 8 pages.
Extended European Search Report for EP Application No. 21214894.4, dated May 3, 2022, 9 pages.
Extended European Search Report for EP Application No. 21201782.6, dated Mar. 28, 2022, 10 pages.
Extended European Search Report for EP Application No. 21205035.5, dated Mar. 28, 2022, 9 pages.
Extended European Search Report for EP Application No. 21214138.6, dated Apr. 25, 2022, 7 pages.

* cited by examiner

SURFACE IGNITER COOLING SYSTEM

BACKGROUND

The present disclosure relates to gas turbine engines and, more particularly, to cooling arrangements suitable for torch igniters used in the combustor section of a gas turbine engine.

Torch igniters can be used in lieu of spark igniters to provide an ignition source for combustors located in gas turbine engines. Torch igniters provide a flame as an ignition source for a combustor rather than the electric current provided by spark igniters. Consequently, torch igniters can provide a larger target for fuel injectors used in a combustor, allowing a greater range of fuel injector designs to be used. However, due to their location in a gas turbine engine, torch igniters can experience temperatures exceeding 3000-4000° F. These high temperature conditions often exceed the thermal limits of materials used in torch igniter construction, negatively impacting the durability of a torch igniter device.

SUMMARY

In one embodiment, the present disclosure provides a torch igniter for a combustor of a gas turbine engine that includes a combustion chamber oriented about an axis, a cap defining an axially upstream end of the combustion chamber, a tip defining the axially downstream end of the combustion chamber, an igniter wall extending from the cap to the tip and defining a radial extent of the combustion chamber, a structural wall coaxial with and surrounding the igniter wall, an outlet passage defined by the igniter wall within the tip, a glow plug housing that is configured to receive a glow plug and allow an innermost end of the glow plug to extend into the combustion chamber, and a cooling system. The axially upstream and downstream ends of the combustion chamber define a flow direction through the combustion chamber. The cap is oriented about the axis and is configured to receive a fuel injector and a glow plug. The outlet passage is fluidly connected to the combustion chamber. The glow plug housing extends through the structural and igniter walls at the cap. The cooling system includes an air inlet formed within an exterior of the structural wall, a cooling channel forming a flow path extending from the air inlet and through the structural wall at the glow plug housing, and an air passage extending through the igniter wall transverse to the axis. The air inlet is configured to intake a flow of air from a compressor section of the gas turbine engine. The flow path includes a section surrounding the glow plug housing and configured to flow air taken in at the air inlet around the glow plug housing to cool the glow plug housing. The air passage fluidly connects the cooling channel to the combustion chamber.

In another embodiment the present disclosure provides a method of cooling a torch igniter for a combustor in a gas turbine engine that includes intaking a flow of air from a compressed air source at an air inlet, flowing the air through a flow path, and flowing the air through an air passage. The air inlet is formed in a structural wall of the igniter. The structural wall extends coaxially with and surrounds an igniter wall. The igniter wall defines a combustion chamber within the torch igniter. The flow path is disposed to surround a glow plug housing. The glow plug housing is configured to receive a glow plug and allow an innermost end of the glow plug to extend into the combustion chamber, and also extends through the structural and igniter walls at a cap of the torch igniter. The air passage extends through the igniter wall and is in fluid communication with the cooling channel and the combustion chamber.

BRIEF DESCRIPTION OF THE DRAWINGS

FIG. 7 is cross-sectional view of another example of an arrangement of cooling passages for a torch igniter While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure presents structures and methods for cooling surface igniters, such as glow plugs, used in a torch igniter housed in the combustor section of a gas turbine engine. These devices, structures, and methods cool a surface igniter with high-pressure air, such as air exiting the high-pressure section of a gas turbine engine. This air is subsequently fed into a combustion chamber of the torch igniter for combustion within the torch igniter, preventing potential downstream thermal stress that could result from allowing the cooling air to bypass the combustor section. As such, the cooling schemes of the present invention reduce temperature tolerance requirements for the housing of the surface igniter, allowing it to be constructed from high-temperature metallic components readily fabricable via additive manufacturing. Further, the cooling schemes of the present invention can provide cooling to resistively-heated surface igniters exposed to hot combustion gases, preventing the heat of combustion from traveling to the electrical connections used for resistive heating.

Figure 1:
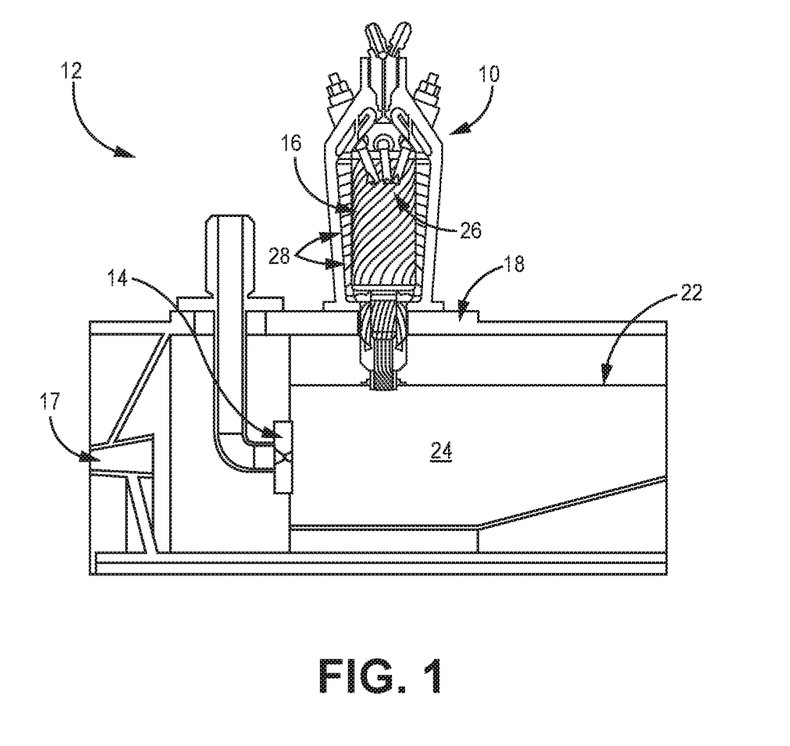
FIG. 1 is a cross-sectional view of an example of a torch igniter within the combustion section of a gas turbine engine.

FIG. 1 is a cross-sectional view of torch igniter 10 disposed within combustor section 12 of a gas turbine engine. Torch igniter 10 can be mounted orthogonally to the direction of a fuel spray from fuel nozzle 14, such that combustion chamber 16 of torch igniter 10 is located outside of high-pressure case 18 while the tip of torch igniter 10 is mounted through liner 22 of combustor 24. The example of torch igniter 10 in FIG. 1 is shown as having glow plugs 26. Glow plugs 26 are resistive heating elements used as surface igniters to ignite fuel and create combustion within torch igniter 10, creating a flame that can be used to ignite combustion within combustor 24. In operation, air enters high-pressure case 18 through inlet 17. Torch igniter 10 intakes high-pressure air from the inside of high-pressure case 18 via an inlet disposed in the tip of torch igniter 10. The high-pressure air is channeled through cooling channels 28 to cool a liner of combustion chamber 16 before it is channeled into combustion chamber 16 to be used in combustion within torch igniter 10. Combustion chamber 16 is in fluid communication with an internal volume of combustor 24 via an outlet within the tip, allowing a flame created by combustion within torch igniter 10 to reach the interior of combustor 24 and thereby ignite fuel within combustor 24. The inner wall of combustion chamber 16 is depicted as transparent in FIG. 1 to show the helical structure of cooling channels 28.

Figure 2:
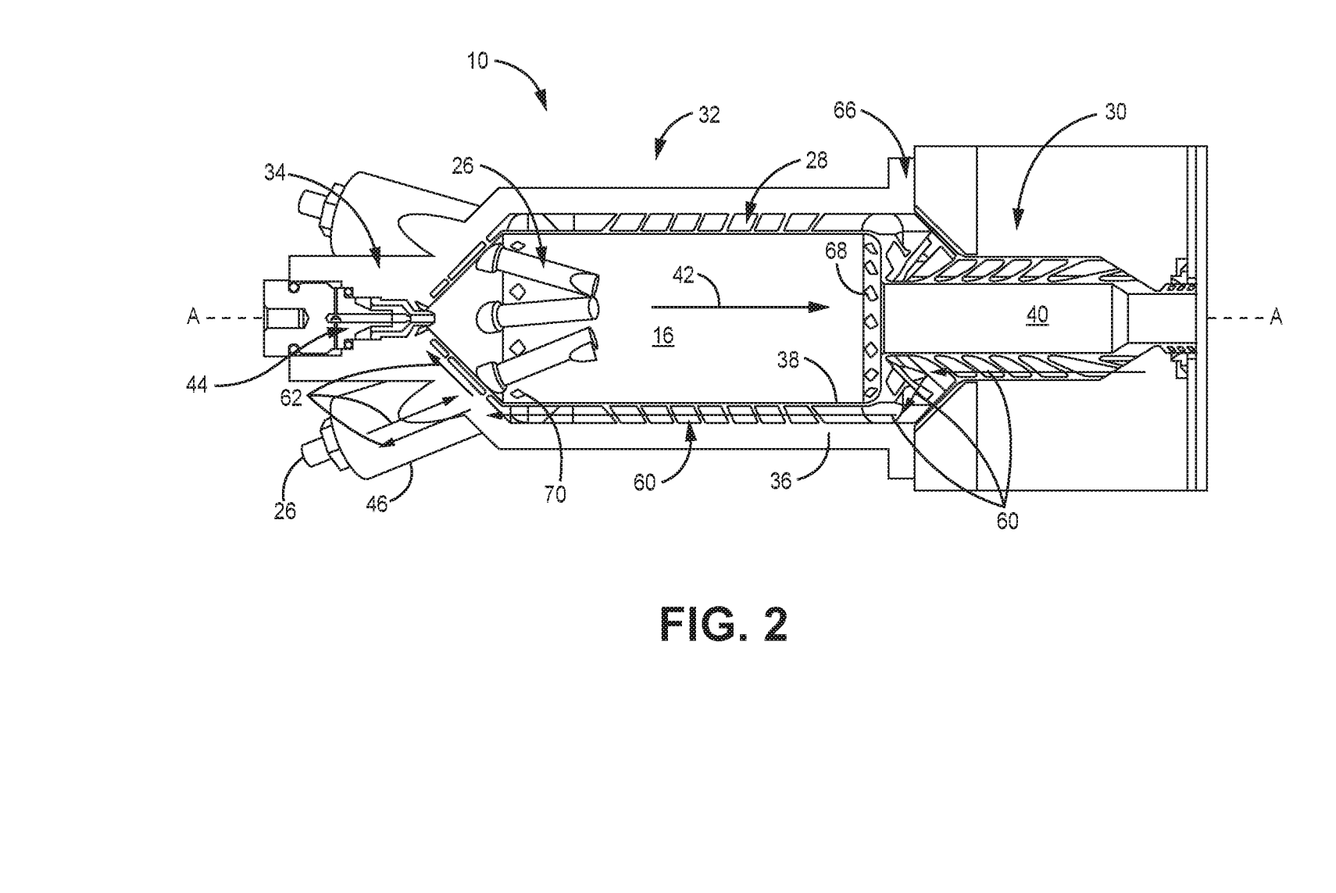
FIG. 2 is a cross-sectional view of an example of a torch igniter having a cooling arrangement that cools a glow plug.

FIG. 2 is a cross-sectional view of torch igniter 10 showing the flow of cooling air through torch igniter 10, including the flow of cooling air around glow plug 26. Torch igniter 10 is composed of tip section 30, combustion section 32, and cap section 34. Cooling channel 28 is formed in the wall of torch igniter 10 in a generally annular space extending between structural wall 36 and igniter wall 38. Air flowing through cooling channel 28 is able to cool igniter wall 38, thereby also protecting structural wall 36 from thermal stresses due to combustion occurring inside combustion chamber 16. Igniter wall 38 surrounds the internal volume of torch igniter 10, which includes combustion chamber 16 and outlet passage 40, such that igniter wall 38 runs from the end of tip section 30 to cap section 34. Igniter wall 38 may be annular where it surrounds combustion chamber 16 and outlet passage 40, and may be dome- or cone-shaped where it extends adjacent to cap section 34. Further, igniter wall 38 has a larger diameter where it surrounds combustion section 16 than where it surrounds outlet passage 40. In the depicted example, igniter wall 38 causes outlet passage 40 to narrow as it extends toward combustor liner 22.

In the illustrated example, torch igniter 10 is arranged such that tip section 30, combustion section 32, and cap section 34 are all arranged coaxially about axis A-A. In some embodiments, these components can be disposed symmetrically about axis A-A. Arrow 42 shows the general direction of flow for fluids within combustion chamber 16 of torch igniter 10. Thus, torch igniter 10 has upstream and downstream ends oriented along axis A-A and according to the direction of arrow 42. Combustion chamber 16 and outlet passage 40 are fluidly connected such that gases are able to flow from combustion chamber 16 toward tip section 30 and to outlet passage 40. Gases are able to exit torch igniter 10 and enter an internal volume of the combustor via outlet passage 40. To this extent, cap section 34 is disposed at the upstream end of torch igniter 10 and tip section 30 is disposed at the downstream end of torch igniter 10. It should be understood, however, that tip section 30 may be disposed and/or oriented at any suitable location and in any suitable direction on the downstream end of torch igniter 10, and oriented in any direction suitable to direct flame for engine ignition, including any locations/orientations not coaxial with axis A-A.

During operation, combustion occurs within combustion chamber 16. Hot gases exit torch igniter into a combustor of a gas turbine engine via outlet passage 40. Generally, the portion of torch igniter 10 internal to structural wall 36 is at a higher pressure than the area external to structural wall 36 during operation. Structural wall 36 functions as pressure vessel and is generally strong enough that it does not deform or leak gases, such as combustion gases or cooling air, under this operational pressure differential. However, the rigidity of structural wall 36 can be negatively affected by the high temperatures of combustion gases produced in combustion chamber 16. Igniter wall 38 acts as a liner to protect the material integrity of structural wall 36 from the heat of combustion in combustion chamber 16. Advantageously, cooling of igniter wall 38 via air circulating through channels 28 reduces temperature tolerance requirements for the igniter wall 38, allowing it to be constructed monolithically from a metallic material readily fabricable via additive manufacturing. Likewise, additive manufacturing techniques enable the construction of complex cooling structures within channel 28, such as cooling fins, to improve cooling of igniter wall 38.

Torch igniter 10 causes combustion within combustion chamber 16 by using fuel injector 44 to inject a fuel-air mixture that impinges on the surface of glow plug 26. Glow plug 26 extends through cap section 34, such that it has an internal end and an external end. Further, glow plug 26 can be resistively heated such that it is able to ignite the fuel-air mixture injected by fuel injector 44. Fuel injector 44 generally injects the fuel-air mixture in a conical volume centered on axis A-A that impinges on the internal end of glow plug 26. To improve ignition of fuel injected by fuel injector 44, torch igniter 10 can be configured with multiple glow plugs 26 at multiple locations within combustion chamber 16. Further, if the injection pattern of fuel injector 44 is distorted by, for example, coking, using multiple glow plugs 26 at multiple locations within combustion chamber 16 can improve the likelihood that the injected fuel impinges on at least one glow plug 26. For example, torch igniter 10 can in some examples be equipped with six glow plugs 26 distributed circumferentially, and in some cases symmetrically, about cap section 34.

Generally, glow plug 26 is mounted to cap section 34 via glow plug housing 46. Glow plug housing 46 extends through structural wall 36 and igniter wall 38 of torch igniter 10 and thereby allows glow plug 26 to extend into combustion chamber 16. Glow plug 26 may be removably attached to glow plug housing 46, such as by a screw attachment, or may be non-removably attached to glow plug housing 46. In some examples where glow plug 26 is removably attached, it is brazed to a metal sheath. The sheath can have, for example, screw-threading that allows glow plug 26 to be attached via screw attachment. In the depicted example, the axis of glow plug 26 deviates from axis A-A. However, it should be understood that glow plug 26 may be oriented in any suitable direction such that one end of glow plug 26 extends into combustion chamber 16.

Glow plug 26 is also connected to a power source capable of delivering electric current to the external end of glow plug 26, allowing for the electrically-resistive heating of glow plug 26. In examples where torch igniter 10 contains multiple glow plugs 26, they may be connected to more than one power source or may be connected in a series, parallel, or combination arrangement to a single power source. Generally, glow plug 26 is formed of a material capable of being non-destructively resistively heated. For example, glow plug 26 can be formed of a ceramic material, such as silicon nitride.

Torch igniter 10 intakes high-pressure air from inside high-pressure case 18 via inlet an inlet in tip section 30, as indicated by arrows 60. In the depicted example, channels 28 are shaped helically in tip section 30 and combustion section 32. Air leaving combustion section 32 flows into passages in glow plug housing 46. Arrows 62 indicate the flow of air through glow plug housing 46. Air flows outward toward the outer end of glow plug 26 before it is turned to flow back toward combustion chamber 16 and igniter wall

38. A portion of air flows through metering holes 68. Channels 28 in cap section 34 turn the air to flow toward fuel injector 44. Channels 28 then route the air through another flow path (not shown) to flow through air swirl hole 70. Cooling of glow plug housing 46 via air circulating through channels 28 reduces temperature tolerance requirements for glow plug housing 46, allowing it to be formed monolithically with torch igniter 10 from a metallic material readily fabricable via additive manufacturing.

Elbow region 66 is formed by the difference in the diameter of igniter wall 38 where it surrounds combustion chamber 16 and outlet passage 40. Channels 28 extend generally radially through elbow region 66. In elbow region 66, a portion of cooling air is diverted through metering hole 68, which fluidly connects channel 28 to combustion chamber 16. Metering hole 68 is disposed downstream of the internal ends of glow plugs 26 and functions to reduce or meter the flow of air flowing through channel 28 toward air swirl hole 70 and thereby optimize ignition conditions near fuel injector 44. Air leaving metering hole 68 also functions to ignite any residual fuel leaving combustion chamber 16 and entering outlet passage 40, preventing introduction of unignited fuel in combustor 24. Generally, combustion gases flowing through combustion chamber 16 tend to be hotter at elbow region 66 than in other locations throughout the torch igniter. Further, the narrowing of igniter wall 38 at elbow region 66 causes acceleration of combustion gases through outlet passage 40, resulting in creased convection of hot combustion gases near elbow region 66. This causes greater heat transfer into igniter wall 38 at elbow region 66 than other regions of igniter wall 38. When metering hole 68 is disposed adjacent to the portion of igniter wall 38 in elbow region 66, the air diverted through metering hole 68 can cool gases at elbow region 66 to protect igniter wall 38, thereby increasing the longevity of igniter wall 38.

The portion of air that is not diverted through metering hole 68 continues flowing to the section of channel 28 embedded in cap section 34 and further to air swirl hole 70. Air swirl hole 70 is disposed at a downstream location of cap section 34 and fluidly connects channel 28 to combustion chamber 16. In the depicted example, channel 28 turns back 180° and forms a dual-layer structure in cap section 34 with the outer layer connected to air swirl hole 70, which allows channel 28 to cool the entirety of igniter wall 38 along the inside of cap section 34 while also allowing for air swirl hole 70 to be positioned along igniter wall 38 at a location outside of cap section 34 and to be oriented transversely to the flow direction. To connect channel 28 to combustion chamber 16 from the exterior portion of cap section 34, air swirl hole 70 extends through and crosses the inner portion of channel 28. Air entering combustion chamber 16 through air swirl hole 70 is used with the air-fuel mixture injected by fuel injector 44 for combustion within combustion chamber 16. In the depicted example, air swirl hole 70 is positioned upstream of the interior end of glow plug 26 in order to optimize mixing of air entering through air swirl hole 70 with combustion gases inside combustion chamber 16. It should be understood, however, that air swirl hole 70 may be positioned at any point along combustion chamber 16 such that air exiting air swirl hole 70 can be utilized for combustion.

As noted above, the configuration of cooling channel 28 shown in FIG. 2 allows all air taken in through a single inlet or set of co-spatial inlets to be used to cool the entirety of igniter wall 38 from cap section 34 to tip section 30. The configuration further allows all taken in air to exit channel 28 metering hole 68 or air swirl hole 70 and ultimately into the interior of combustor 24. Advantageously, this configuration prevents downstream thermal stress that could result from allowing the cooling air to bypass the combustor section.

In the depicted embodiment, air swirl hole 70 is positioned upstream of the interior end of glow plugs 26. Positioning air swirl hole 70 at an upstream location of combustion chamber 16 advantageously allows air exiting swirl hole 70 to be used to create a self-sustaining flame. Specifically, the depicted position and previously described transverse orientation of air swirl hole 70 allows air exiting air swirl hole 70 to create a recirculation zone within combustion chamber 16. The recirculation zone creates a low-pressure zone along the centerline of axis A-A and allows for upstream flow of combustion gases along the perimeter of combustion chamber 16. Upstream-flowing combustion gases are heated from the combustion reaction, allowing them to evaporate fuel injected by fuel injector 44 and thereby perpetuate combustion. In examples where torch igniter 10 can create a self-sustaining flame, glow plugs 26 do not have to be resistively heated during the entire operation of torch igniter 10. Rather, glow plugs 26 can be resistively heated only to create an initial ignition of fuel within combustion chamber 16 and then their resistive heating can be stopped Air leaving metering hole 68 also functions to ignite any residual fuel leaving combustion chamber 16 and entering outlet passage 40, preventing introduction of unignited fuel in combustor 24.

Generally, torch igniter 10 operates continuously during the entire operation time of the gas turbine engine in which it is located. Continuous operation allows torch igniter 10 to easily facilitate altitude re-lights of combustor 24 by acting as a pilot light for fuel ignition within combustor 24. Further, creating a self-sustaining flame allows for the continuous operation of torch igniter 10 during the course of operation of the gas turbine engine without requiring continuous resistive heating of glow plugs 26.

Advantageously, torch igniter 10 can be operated with minimal fuel consumption during continuous operation. Limiting the fuel fed to combustion within torch igniter 10 can prevent a hot streak of combustion gases from entering combustor 24 and damaging combustor liner 22. Generally, the torch igniter inlet intakes air at a variable rate that depends on engine pressurization and fuel injector 44 injects fuel at a rate that varies proportionally with the rate that air is taken in by the inlet. For example, during a pre-takeoff startup of torch igniter 10, the inlet may intake air at a rate of approximately 10 lbs. per hour. However, during takeoff conditions or continuous operation, the inlet can intake air at a rate of approximately 400 lbs. per hour. The amount of fuel injected by fuel injector 44 is selected to provide an appropriate amount of fuel to form a stable air/fuel mixture in combustion chamber 16. One such arrangement allows fuel injector 44 to provide enough fuel such that the ratio of fuel to air in combustion chamber 16 is 10:1 at any point during operation. For example, fuel injector 44 may provide 1 lb. of fuel per hour during a pre-takeoff startup and may provide 40 lbs. per hour of fuel during takeoff or continuous operation. However, when air taken in through the inlet is sufficiently hot, less fuel may be required for continuous operation of torch igniter 10. Under these conditions, torch igniter 10 may be operated with an air to fuel ratio of 30:1, allowing torch igniter to be continuously operated with as low as 15 lbs. of fuel per hour.

Figure 3:
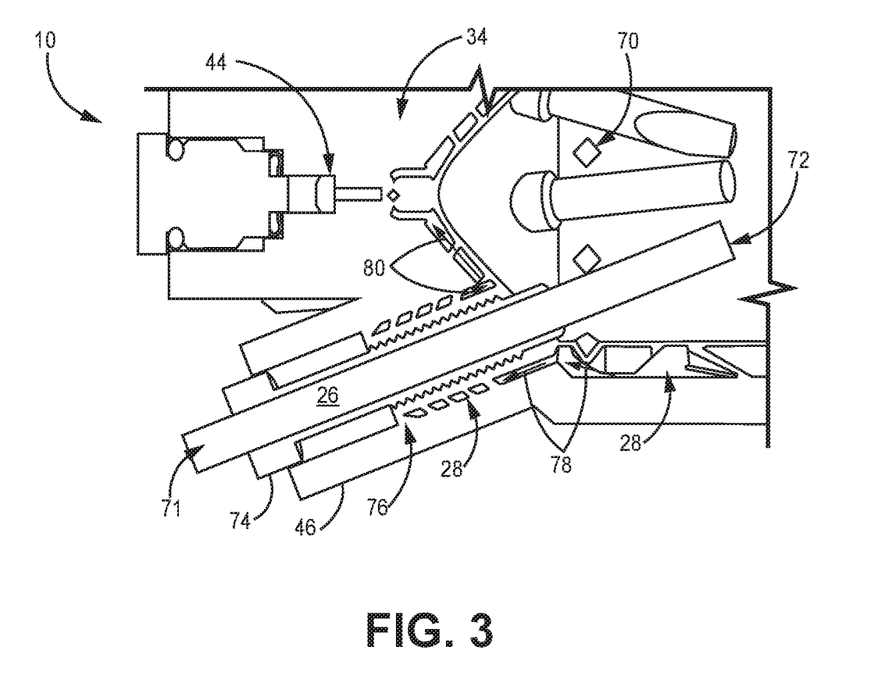
FIG. 3 is cross-sectional view of an example of cooling arrangement for a glow plug housing.

FIG. 3 is a cutaway view of glow plug housing showing channels 28 in glow plug housing 46. Glow plug 26 has exterior end 71 and interior end 72, and is attached to sheath 74. Sheath 74 has an annular structure and surrounds the portion of glow plug 26 extending through glow plug housing 46. Sheath 74 may be attached non-removably to glow plug 26, such as by brazing, or may be removably attached by suitable means. Further, sheath 74 is removably mounted to glow plug housing 46 via a screw attachment at receiver portion 76 of glow plug housing 46. However, it should be understood any suitable connection may be used. Likewise, sheath 74 may be non-removably attached, such as by brazing or welding, or glow plug 26 may be attached directly to glow plug housing 46.

Air flows from channels 28 within combustion section 32 to channels 28 around glow plug housing 46 according to arrows 78 to cool glow plug housing 46, sheath 74, and glow plug 26. Air flows outward toward exterior end 71 and turns at the outermost end of receiver portion 76. Air then flows inward toward interior end 72 before being turned to flow toward fuel injector 44, as indicated by arrow 80.

Figure 4:
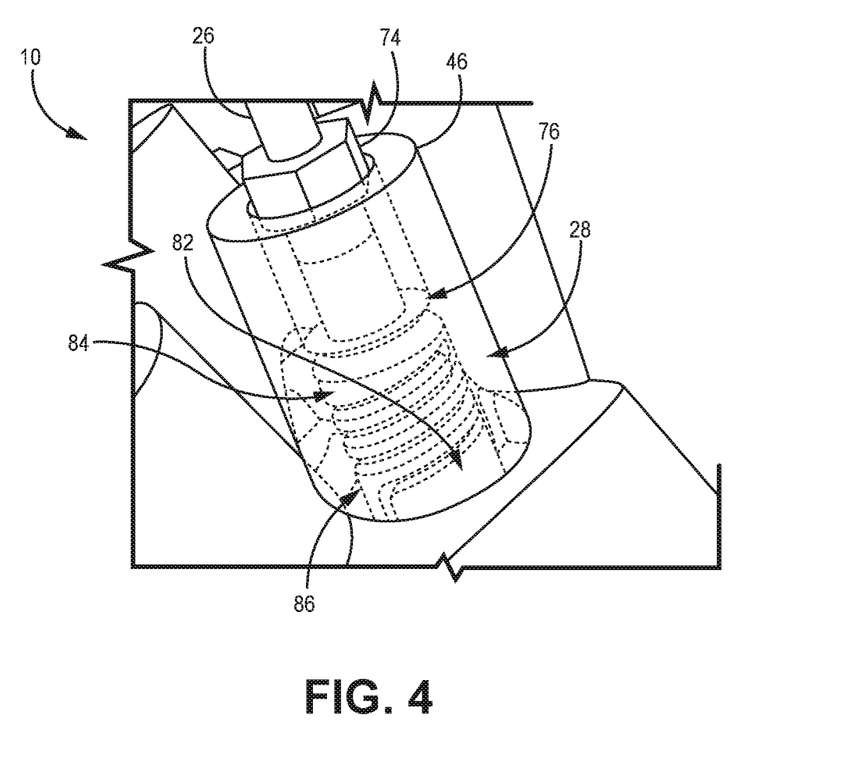
FIG. 4 is a cutaway view of an example of the cooling arrangement for a glow plug housing of FIG. 3.
Figure 5:
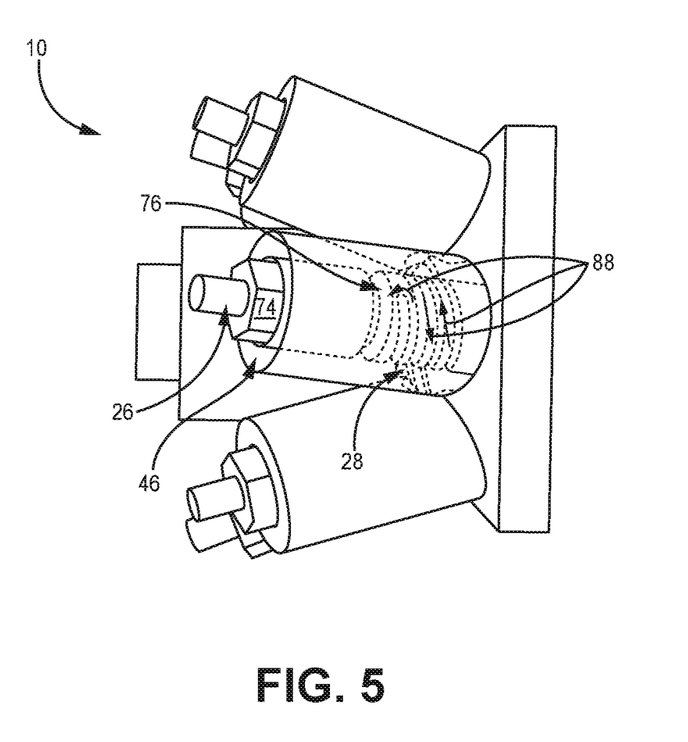
FIG. 5 is a cutaway view of an example of the cooling arrangement for a glow plug housing of FIG. 3 showing flow paths through the cooling arrangement.

FIG. 4 is a cutaway view showing channels 28 in glow plug housing 46. Channels 28 extend along the length of receiver portion 76 and have three primary sections: outbound section 82, turn section 84, and return section 86. Outbound section 82 and return section 86 are both helical and have identical helical radii, thereby forming a double-helix structure. Turn section 84 is located adjacent to the exterior side of receiver portion 76. FIG. 5 is a cutaway view showing the flow of air through channels 28 in glow plug hosing 46 as arrows 88. Air flows through outbound section 82 toward exterior end 71. Air flowing through outbound section 82 is received at turn section 84. Turn section 84 turns the flow of air 180° and toward return section 86. Air exiting turn section 84 flows through return section 86 toward interior end 72 and eventually toward fuel injector 44.

Figure 6:
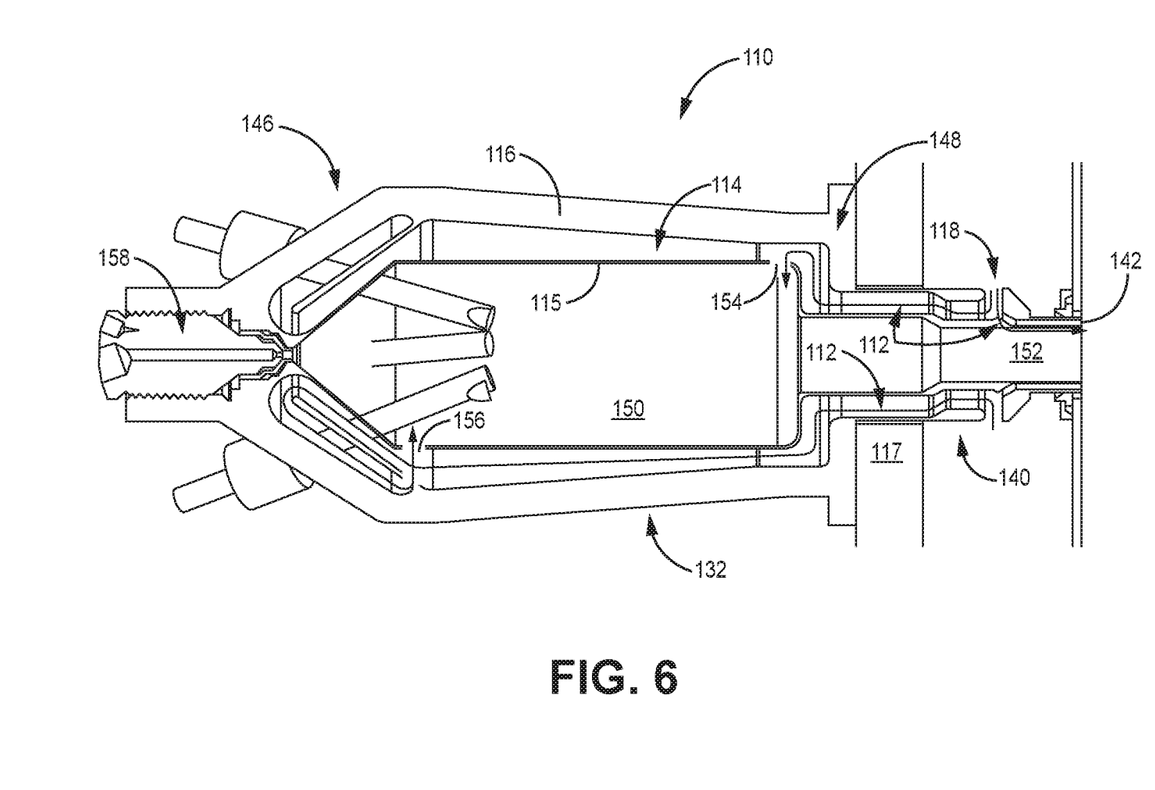
FIG. 6 is cross-sectional view of an example of an arrangement of cooling passages for a torch igniter.
Figure 7:
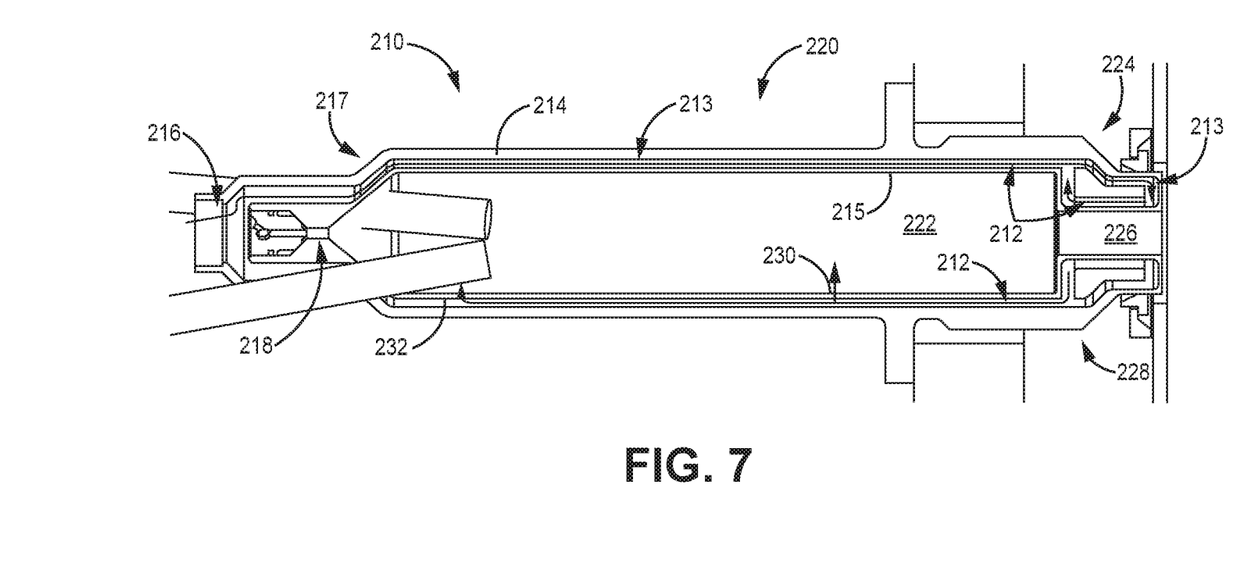

Notably, channels having outbound section 82, turn section 84, and return section 86 surrounding a glow plug within a glow plug housing can be implemented in a variety of flow configurations. FIGS. 6 and 7 show examples of flow configurations in which the glow plug cooling system disclosed herein could be implemented.

FIG. 6 is a cross-sectional view of torch igniter 110, which is an alternative torch igniter design arranged substantially similarly to torch igniter 10. Arrows 112 indicate the general flow path of cooling air through cooling channel 114. Cooling channel 114 forms flow paths between igniter wall 115 and structural wall 116, both of which have generally annular structures. Torch igniter 110 intakes high-pressure air from inside high-pressure case 117 via inlet 118. As shown by arrows 112, the air entering air inlet 118 first flows radially inward toward igniter wall 115. The air then splits into two main flow paths. One flow path flows air toward the end of tip section 140 and through tip hole 142, providing cooling air to the entirety of igniter wall 115 within tip section 140. Tip hole 142 is fluidly connected to and provides air to the interior of the combustor. The other flow path flows air toward cap section 146 and elbow region 148. The flow rate of air flowing through tip hole 142 is generally limited to prevent the formation of a cold streak in the combustor that could damage the combustor liner.

Elbow region 148 is formed by the difference in the diameter of igniter wall 115 where it surrounds combustion chamber 150 and outlet passage 152. Channels 114 extend generally radially through elbow region 148 and are fluidly connected to combustion chamber 150 by metering hole 154 and air swirl hole 156. In elbow region 148, a portion of cooling air is diverted through metering hole 154, which fluidly connects channel 114 to combustion chamber 150. metering hole 154 diverts a portion of air flowing toward air swirl hole 156 and functions to reduce or meter the flow of air flowing to air swirl hole 156. The amount of air diverted through metering hole 154 is selected to optimize combustion conditions near fuel injector 158.

The portion of air that is not diverted through metering hole 154 continues flowing to the section of channel 114 embedded in cap section 146 and further to air swirl hole 156. Air swirl hole 156 fluidly connects channel 114 to combustion chamber 150. In the depicted example, channel 28 turns back 180° and forms a dual-layer structure in cap section 146 with the outer layer connected to air swirl hole 156, allowing channel 114 to cool the entirety of igniter wall 115 along the inside of cap section 146 and also allows the entirety of high-pressure air flowing through channel 114 to be utilized for combustion inside of combustion chamber 150. To connect channel 114 to combustion chamber 150 from the exterior portion of cap section 146, air swirl hole 156 extends through and crosses the inner portion of channel 114.

The glow plug cooling system consisting of outbound section 82, turn section 84, and return section 86 can be implemented in a torch igniter having the cooling arrangement of torch igniter 110. For example, outbound section 82 can receive air flowing through channel 114 toward cap section 146 and air swirl hole 156 at outbound section 82. Return section 86 can return air to channel 114 in cap section 146 before it continues flowing to air swirl hole 156, thereby allowing for the cooling of glow plugs in an igniter having the cooling arrangement of torch igniter 110 without requiring substantial revision of the cooling system.

FIG. 7 is a cross-sectional view of torch igniter 210, which is an alternative torch igniter design arranged substantially similarly to torch igniters 10 and 110. Arrows 212 indicate the flow path of high-pressure air through cooling channel 213. Channel 213 forms flow paths for air between structural wall 214 and igniter wall 215. Air inlet 216 intakes high-pressure air, such as air exiting the high-pressure compressor section, and feeds into channel 213. Channel 213 embedded in cap 217 passes air through fuel injector 218 and channels air toward the section of channel 213 embedded in combustion section 220. The section of channel 213 embedded in combustion section 220 and surrounding combustion chamber 222 is configured with two separate flow paths, the first of which flows air exiting the section of channel 213 embedded in cap 217 axially toward tip 224. At tip 224, air is channeled radially inward toward outlet passage 226, turned to flow axially back toward cap 217, and then turned to flow radially outward at elbow region 228. The second, return section of channel 213 receives air at elbow region and channels it axially back toward cap section 34. The two flow paths may occupy equal or nonequal portions of the axial portion of channels 213.

Air exits channel 213 via metering hole 230 and air swirl hole 232, both of which are fluidly connected to the return section of channel 213. Metering hole 230 diverts a portion of air flowing toward air swirl hole 232 and functions to meter the flow of air flowing through channel 213 toward air swirl hole 232, thereby optimizing combustion conditions near fuel injector 218. Air leaving metering hole 230 also facilitates the ignition any residual fuel leaving combustion chamber 222 and entering outlet passage 226, preventing introduction of unignited fuel in a combustor to which torch igniter 210 is attached. In some embodiments, metering hole 230 can be disposed near elbow region 228. Further, due to the diameter difference between the portions of igniter wall 215 that surround combustion chamber 222 and outlet passage 226, hot gases tend to accumulate along igniter wall in elbow region 228. When metering hole 230 is disposed adjacent to the portion of igniter wall 215 in elbow region 228, the air diverted through metering hole 230 can cool gases accumulated in elbow region 228 to protect igniter wall 215, thereby increasing the longevity of igniter wall 215.

The portion of air that is not diverted through metering hole 230 flows through channel 213 toward air swirl hole 232. Channel 213 is connected to air swirl hole 232, which fluidly connects channel 213 to combustion chamber 222. Air entering combustion chamber 222 through air swirl hole 232 is used for combustion within combustion chamber 222.

The glow plug cooling system consisting of outbound section 82, turn section 84, and return section 86 can be implemented in an igniter having the cooling arrangement of torch igniter 210. For example, outbound section 82 can receive air flowing through channel 213 from cap 217 toward tip 224 at outbound section 82. Return section 86 can return air to channel 213 before it continues flowing toward tip 224 and ultimately back to air swirl hole 23, thereby allowing for the cooling of glow plugs in an igniter having the cooling arrangement of torch igniter 210 without requiring substantial revision of the cooling system.

Advantageously, the cooling configurations shown in FIGS. 6 and 7 and described herein allow all cooling air to ultimately be channeled to a combustor. Further, with the exception of air flowing through tip hole 142 in torch igniter 110, all air enters a combustion chamber within the torch igniter and can thereby be utilized for combustion. These configurations reduce the incidence of cold streaks in the combustor, thereby reducing thermal stress on the combustor liner. Furthermore, these configurations prevent downstream thermal stresses that could result from allowing the cooling air to bypass the combustor section.

In at least some examples, torch igniter 10, including outbound section 82, turn section 84, and return section 86, is formed monolithically. More generally, all components of torch igniter 10 can be formed partially or entirely by additive manufacturing. Notably, however, glow plug 26, sheath 74, and fuel injector 44 are generally formed so that they are removable, including in examples where torch igniter 10 is otherwise formed monolithically. This allows glow plug 26 to be replaced in the event of failure and for fuel injector 44 to be removed for replacement, repair, or cleaning. For metal components (e.g., Inconel, aluminum, titanium, steel, etc.) exemplary additive manufacturing processes include but are not limited to powder bed fusion techniques such as direct metal laser sintering (DMLS), laser net shape manufacturing (LNSM), electron beam manufacturing (EBM). Support-free additive manufacturing techniques, such as binder jetting, can also be used to form components of any torch igniter disclosed herein. Additive manufacturing is particularly useful in obtaining unique geometries (e.g., outbound section 82, turn section 84, and return section 86) and for reducing the need for welds or other attachments (e.g., between tip section 30, combustion section 32, and cap section 34 of torch igniter 10). However, other suitable manufacturing process can be used. For example, any or all of outbound section 82, turn section 84, and return section 86 can be fabricated separately and joined via later manufacturing steps, such as brazing, welding, or compression fitting. Similarly, any or all of tip section 30, combustion section 32, and cap section 34 can in some examples be fabricated separately and joined via later manufacturing steps to form torch igniter 10.

In all examples of torch igniters disclosed herein, glow plug 26 and glow plug housing 46 are capable of being cooled using air that that is ultimately utilized in combustion within the torch igniter. As glow plugs 26 are exposed to the heat of combustion gases, these cooling arrangements protect the electrical connections that connect a power source to external end 71 from heat traveling through glow plug 26. These cooling arrangements also allow for cooling of glow plug housing 46 from excessive heat from glow plug 26.

Discussion of Possible Embodiments

The following are non-exclusive descriptions of possible embodiments of the present invention.

An embodiment of a torch igniter for a combustor of a gas turbine engine includes a combustion chamber oriented about an axis, a cap defining an axially upstream end of the combustion chamber, a tip defining the axially downstream end of the combustion chamber, an igniter wall extending from the cap to the tip and defining a radial extent of the combustion chamber, a structural wall coaxial with and surrounding the igniter wall, an outlet passage defined by the igniter wall within the tip, a glow plug housing that is configured to receive a glow plug and allow an innermost end of the glow plug to extend into the combustion chamber, and a cooling system. The axially upstream and downstream ends of the combustion chamber define a flow direction through the combustion chamber. The cap is oriented about the axis and is configured to receive a fuel injector and a glow plug. The outlet passage is fluidly connected to the combustion chamber. The glow plug housing extends through the structural and igniter walls at the cap. The cooling system includes an air inlet formed within an exterior of the structural wall, a cooling channel forming a flow path extending from the air inlet and through the structural wall at the glow plug housing, and an air passage extending through the igniter wall transverse to the axis. The air inlet is configured to intake a flow of air from a compressor section of the gas turbine engine. The flow path includes a section surrounding the glow plug housing and configured to flow air taken in at the air inlet around the glow plug housing to cool the glow plug housing. The air passage fluidly connects the cooling channel to the combustion chamber.

The torch igniter of the preceding paragraph can optionally include, additionally and/or alternatively, any one or more of the following features, configurations and/or additional components:

A torch igniter for a combustor of a gas turbine engine according to an exemplary embodiment of this disclosure, among other possible things includes a combustion chamber oriented about an axis, a cap defining an axially upstream end of the combustion chamber, a tip defining the axially downstream end of the combustion chamber, an igniter wall extending from the cap to the tip and defining a radial extent of the combustion chamber, a structural wall coaxial with and surrounding the igniter wall, an outlet passage defined by the igniter wall within the tip, a glow plug housing that is configured to receive a glow plug and allow an innermost end of the glow plug to extend into the combustion chamber, and a cooling system. The axially upstream and downstream ends of the combustion chamber define a flow direction through the combustion chamber. The cap is oriented about the axis and is configured to receive a fuel injector and a glow plug. The outlet passage is fluidly connected to the combustion chamber. The glow plug housing extends through the structural and igniter walls at the cap. The cooling system includes an air inlet formed within an exterior of the structural wall, a cooling channel forming a flow path extending from the air inlet and through the structural wall at the glow plug housing, and an air passage extending through the igniter wall transverse to the axis. The air inlet is configured to intake a flow of air from a compressor section of the gas turbine engine. The flow path includes a section surrounding the glow plug housing and configured to flow air taken in at the air inlet around the glow plug housing to cool the glow plug housing. The air passage fluidly connects the cooling channel to the combustion chamber.

A further embodiment of the foregoing torch igniter, wherein the air inlet is disposed in the tip.

A further embodiment of any of the foregoing torch igniters, wherein the flow path is further configured to flow air from the air inlet to the glow plug housing around the outlet passage and combustion chamber, flow air from the glow plug housing to an upstream location of the cap, turn the flow of air at the upstream location of the cap to flow back toward the tip before flowing the air through the air passage.

A further embodiment of any of the foregoing torch igniters, wherein the air inlet is disposed in the cap, the air is compressed air from a high-pressure case of the gas turbine engine, and a portion of the flow path is disposed between the igniter wall and the structural wall.

A further embodiment of any of the foregoing torch igniters, wherein the flow path is further configured to flow air from the inlet through the cap into the glow plug housing, flow air leaving the glow plug housing around the combustion chamber to an end of the tip, and turn the flow of air at the tip to flow back toward the cap before flowing the air through the air passage.

A further embodiment of any of the foregoing torch igniters, wherein the glow plug comprises a silicon nitride rod.

A further embodiment of any of the foregoing torch igniters, wherein the glow plug comprises a ceramic material and is attached to a metal sheath.

A further embodiment of any of the foregoing torch igniters, wherein the glow plug is removably attached to the glow plug housing.

A further embodiment of any of the foregoing torch igniters, wherein a portion of the flow path is disposed between the igniter wall and the structural wall.

A further embodiment of any of the foregoing torch igniters, wherein the flow path is further configured to flow the air toward an outermost end of the glow plug, turn the flow of air at an outer point of the glow plug housing, and flow the air toward back toward the innermost end and the combustion chamber before flowing the air through the air passage.

A further embodiment of any of the foregoing torch igniters, wherein the outermost end is disposed opposite the innermost end.

A further embodiment of any of the foregoing torch igniters, wherein the glow plug housing receives the glow plug, the innermost end of the glow plug extends into the combustion chamber, and an outermost end of the glow plug away from and is disposed outside of the combustion chamber.

A further embodiment of any of the foregoing torch igniters, wherein the air passage is disposed a location downstream of the innermost end of the glow plug.

A further embodiment of any of the foregoing torch igniters, further comprising a metering passage extending through the igniter wall at a position downstream of the innermost end of the glow plug and fluidly connected to the cooling channel and the combustion chamber.

A further embodiment of any of the foregoing torch igniters, wherein the metering passage is configured to meter the flow of cooling air that flow through the air passage by diverting a portion of the flow into the combustion chamber.

A further embodiment of any of the foregoing torch igniters, wherein the cooling channel comprises a first helical portion that helically extends through the glow plug housing, is fluidly connected to the air inlet, and is configured to flow air outward from the combustion chamber and toward an end of the glow plug housing.

A further embodiment of any of the foregoing torch igniters, wherein the cooling channel comprises a second helical portion that helically extends through the glow plug housing, is fluidly connected to the air swirl hole, and is configured to flow air inward toward the combustion chamber and away from the end of the glow plug housing.

A further embodiment of any of the foregoing torch igniters, wherein the cooling channel comprises an annular portion fluidly connected to the first and second helical portions and configured to turn the flow exiting the first helical portion to enter the second helical portion.

A further embodiment of any of the foregoing torch igniters, wherein the first and second helical portions form a double-helix structure.

A further embodiment of any of the foregoing torch igniters, wherein the cap receives the fuel injector, the fuel injector is configured to inject fuel in a conical volume, and the innermost end of the glow plug extends into the conical volume.

A further embodiment of any of the foregoing torch igniters, wherein at least part of the cooling channel extends helically.

A further embodiment of any of the foregoing torch igniters, wherein the torch igniter is formed monolithically.

A further embodiment of any of the foregoing torch igniters, wherein the cooling system is formed monolithically.

A further embodiment of any of the foregoing torch igniters, wherein at least two portions of the torch igniter are each formed monolithically and attached by an additional manufacturing step.

An embodiment of a method of cooling a torch igniter for a combustor in a gas turbine engine includes intaking a flow of air at an air inlet from a compressed air source, flowing the air through a flow path, and flowing the air through an air passage. The air inlet is formed in a structural wall of the igniter. The structural wall extends coaxially with and surrounds an igniter wall. The igniter wall defines a combustion chamber within the torch igniter. The flow path is disposed to surround a glow plug housing. The glow plug housing is configured to receive a glow plug and allow an innermost end of the glow plug to extend into the combustion chamber, and also extends through the structural and igniter walls at a cap of the torch igniter. The air passage extends through the igniter wall and is in fluid communication with the cooling channel and the combustion chamber.

The method of the preceding paragraph can optionally include, additionally and/or alternatively, any one or more of the following features, configurations and/or additional components:

A method of cooling a torch igniter for a combustor in a gas turbine engine according to an exemplary embodiment of this disclosure, among other possible things includes intaking a flow of air from a compressed air source at an air inlet, flowing the air through a flow path, and flowing the air through an air passage. The air inlet is formed in a structural wall of the igniter. The structural wall extends coaxially with and surrounds an igniter wall. The igniter wall defines a combustion chamber within the torch igniter. The flow path is disposed to surround a glow plug housing. The glow plug housing is configured to receive a glow plug and allow an innermost end of the glow plug to extend into the combustion chamber, and also extends through the structural and igniter walls at a cap of the torch igniter. The air passage extends through the igniter wall and is in fluid communication with the cooling channel and the combustion chamber.

A further embodiment of the foregoing method, wherein the air inlet is disposed in a tip of the torch igniter disposed at an opposite end of the combustion chamber to the cap and a portion of the flow path is disposed between the igniter wall and the structural wall.

A further embodiment of any of the foregoing methods, further comprising flowing the air from the air inlet through an outlet formed by the igniter wall in the tip, and through the combustion chamber before flowing a second portion of the air through the glow plug housing.

A further embodiment of any of the foregoing methods, further comprising flowing the air to an upstream location of the cap after flowing the air through the glow plug housing.

A further embodiment of any of the foregoing methods, further comprising turning the flow of air at the upstream location of the cap to flow back toward the tip before flowing the air through the air passage.

A further embodiment of any of the foregoing methods, further comprising metering the flow of air to the air passage by diverting a portion of the flow through a metering passage before flowing the air through the air swirler passage.

A further embodiment of any of the foregoing methods, wherein the glow plug housing receives the glow plug, the innermost end of the glow plug extends into the combustion chamber, and an outermost end of the glow plug extends away from and is disposed outside of the combustion chamber.

A further embodiment of any of the foregoing methods, wherein flowing the air through the flow path about the glow plug housing comprises flowing the air through a first helical portion that helically surrounds the glow plug housing and is configured to flow air outward from the combustion chamber and toward an end of the glow plug housing.

A further embodiment of any of the foregoing methods, wherein flowing the air through the flow path about the glow plug housing comprises flowing the air through an annular portion fluidly connected to the first helical portion and a second helical portion.

A further embodiment of any of the foregoing methods, wherein the annular portion is configured to turn the flow exiting the first helical portion to enter the second helical portion.

A further embodiment of any of the foregoing methods, wherein flowing the air through the flow path about the glow plug housing comprises flowing the air through the second helical portion.

A further embodiment of any of the foregoing methods, wherein the second helical portion helically surrounds the glow plug housing, is configured to flow air inward toward the combustion chamber and away from the end of the glow plug housing, and is fluidly connected to the air passage.

A further embodiment of any of the foregoing methods wherein the first and second helical portions form a double-helix structure.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A torch igniter for a combustor of a gas turbine engine, the torch igniter comprising:
    a combustion chamber oriented about an axis, the combustion chamber having an axially upstream end and an axially downstream end defining a flow direction through the combustion chamber, along the axis;
    a cap defining the axially upstream end of the combustion chamber and oriented about the axis, wherein the cap is configured to receive a fuel injector and a glow plug;
    a tip defining the axially downstream end of the combustion chamber;
    an igniter wall extending from the cap to the tip and defining a radial extent of the combustion chamber;
    a structural wall coaxial with and surrounding the igniter wall;
    an outlet passage defined by the igniter wall within the tip, wherein the outlet passage is fluidly connected to the combustion chamber;
    a glow plug housing that is configured to receive the glow plug and allow an innermost end of the glow plug to extend into the combustion chamber, the glow plug housing extending through the structural wall and the igniter wall at the cap; and
    a cooling system comprising:
        an air inlet formed within an exterior of the structural wall, the air inlet configured to intake a flow of air from a compressor section of the gas turbine engine;
        a cooling channel forming a flow path extending from the air inlet and through the structural wall at the glow plug housing, the flow path including a section surrounding the glow plug housing and configured to flow air taken in at the air inlet around the glow plug housing to cool the glow plug housing;
        an air passage extending through the igniter wall transverse to the axis, wherein the air passage fluidly connects the cooling channel to the combustion chamber,
    wherein the cooling channel comprises:
    a first helical portion that helically extends through the glow plug housing, is fluidly connected to the air inlet, and is configured to flow air outward of the combustion chamber and toward an end of the glow plug housing;
    a second helical portion that helically extends through the glow plug housing, is fluidly connected to the air passage, and is configured to flow air inward toward the combustion chamber and away from the end of the glow plug housing; and
    an annular portion fluidly connected to the first helical portion and the second helical portion and configured to turn the flow exiting the first helical portion to enter the second helical portion.

2. The torch igniter of claim 1, wherein the air inlet is disposed in the tip and the flow path is further configured to:
    flow air from the air inlet to the glow plug housing around the outlet passage and the combustion chamber;

flow air from the glow plug housing to an upstream location of the cap; and turn the flow of air at the upstream location of the cap to flow back toward the tip before flowing the air through the air passage.

3. The torch igniter of claim 1, wherein the air inlet is disposed in the cap, the air is compressed air from a high-pressure case of the gas turbine engine, a portion of the flow path is disposed between the igniter wall and the structural wall, and the flow path is further configured to:

flow air from the air inlet through the cap into the glow plug housing;

flow air leaving the glow plug housing around the combustion chamber to an end of the tip;

turn the flow of air at the tip to flow back toward the cap before flowing the air through the air passage.

4. The torch igniter of claim 1, wherein the glow plug comprises a silicon nitride rod.

5. The torch igniter of claim 1, wherein the glow plug comprises a ceramic material and is attached to a metal sheath.

6. The torch igniter of claim 1, wherein the glow plug is removably attached to the glow plug housing.

7. The torch igniter of claim 1, wherein a portion of the flow path is disposed between the igniter wall and the structural wall and the flow path is further configured to:

flow the air toward an outermost end of the glow plug, the outermost end disposed opposite the innermost end;

turn the flow of air at an outer point of the glow plug housing;

and flow the air toward the innermost end of the glow plug and the combustion chamber before flowing the air through the air passage.

8. The torch igniter of claim 1, wherein the glow plug housing receives the glow plug, the innermost end of the glow plug extends into the combustion chamber, and an outermost end of the glow plug extends away from and is disposed outside of the combustion chamber.

9. The torch igniter of claim 8, wherein the air passage is disposed at a location downstream of the innermost end of the glow plug.

10. The torch igniter of claim 8, further comprising:

a metering passage extending through the igniter wall at a position downstream of the innermost end of the glow plug and fluidly connected to the cooling channel and the combustion chamber, wherein the metering passage is configured to meter the flow of air through the air passage by diverting a portion of the flow into the combustion chamber.

11. The torch igniter of claim 1, wherein the first helical portion and the second helical portion form a double-helix structure.

12. The torch igniter of claim 1, wherein the cap receives the fuel injector, the fuel injector is configured to inject fuel in a conical volume, and the innermost end of the glow plug extends into the conical volume.

13. The torch igniter of claim 1, wherein at least part of the cooling channel extends helically.

14. A method of cooling a torch igniter for a combustor of a gas turbine engine, the method comprising:

intaking a flow of air from a compressed air source at an air inlet formed in a structural wall of an igniter, wherein the structural wall extends coaxially with and surrounds an igniter wall, the igniter wall defining a combustion chamber within the torch igniter;

flowing the air through a flow path disposed to surround a glow plug housing configured to receive a glow plug and allow an innermost end of the glow plug to extend into the combustion chamber, the glow plug housing extending through the structural wall and the igniter wall at a cap of the torch igniter; and flowing the air through an air passage extending through the igniter wall, wherein the air passage is in fluid communication with the cooling channel and the combustion chamber, wherein flowing the air through the flow path to surround the glow plug housing comprises:

flowing the air through a first helical portion that helically surrounds the glow plug housing and is configured to flow air outward of the combustion chamber and toward an end of the glow plug housing;

flowing the air through an annular portion fluidly connected to the first helical portion and a second helical portion, wherein the annular portion is configured to turn the flow exiting the first helical portion to enter the second helical portion; and flowing the air through the second helical portion, wherein the second helical portion helically surrounds the glow plug housing, is configured to flow air inward toward the combustion chamber and away from the end of the glow plug housing, and is fluidly connected to the air passage.

15. The method of claim 14, wherein the air inlet is disposed in a tip of the torch igniter disposed at an opposite end of the combustion chamber to the cap, a portion of the flow path is disposed between the igniter wall and the structural wall, and further comprising:

flowing the air from the air inlet, through an outlet formed by the igniter wall in the tip, and through the combustion chamber before flowing the air through the glow plug housing;

flowing the air to an upstream location of the cap after flowing the air through the glow plug housing; and turning the flow of air at the upstream location of the cap to flow back toward the tip before flowing the air through the air passage.

16. The method of claim 14, further comprising:

metering the flow of air to the air passage by diverting a portion of the flow through a metering passage before flowing the air through the air passage.

17. The method of claim 14, wherein the glow plug housing receives the glow plug, the innermost end of the glow plug extends into the combustion chamber, and an outermost end of the glow plug extends away from and is disposed outside of the combustion chamber.

18. The method of claim 14, wherein the first helical portion and the second helical portion form a double-helix structure.

* * * * *